April 17, 1945.  G. O. LIEN  2,373,695
EXHIBITING INSTRUMENT
Filed May 15, 1942  2 Sheets-Sheet 2

Inventor
GEORGE O. LIEN
By Clarence A. O'Brien
and Harvey B. Jacobson
Attorneys

Patented Apr. 17, 1945

2,373,695

UNITED STATES PATENT OFFICE 2,373,695

EXHIBITING INSTRUMENT

George O. Lien, Sacramento, Calif.

Application May 15, 1942, Serial No. 443,164

3 Claims. (Cl. 234—1)

The present invention relates to new and useful improvements in recording instruments designed primarily for use by canneries to indicate on a chart the length of time a particular food product has been cooked at a predetermined temperature.

An important object of the present invention is to provide a pair of adjustably spaced indicators mounted in position adjacent the chart and arranged in association with the time graduations thereon to indicate the time elapsing during the cooking of the product and including an adjustable support for the indicators for properly positioning the latter relative to the chart.

A still further object is to provide a device of this character of simple and practical construction, which is efficient and reliable in performance, relatively inexpensive to manufacture, readily installed in operative position with respect to a conventional form of time control rotating chart, and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1:
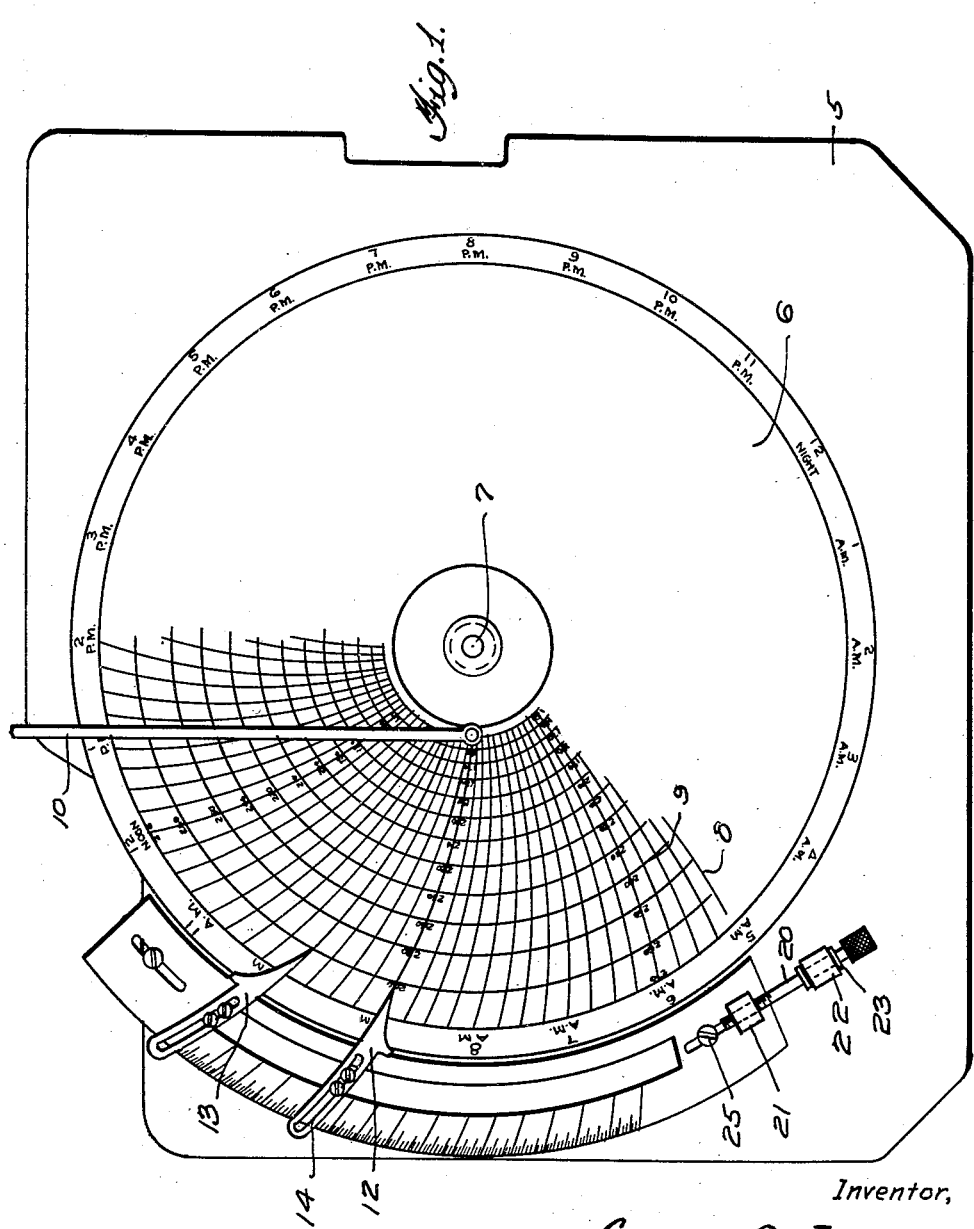
Figure 1 is a front elevational view.
Figure 2:
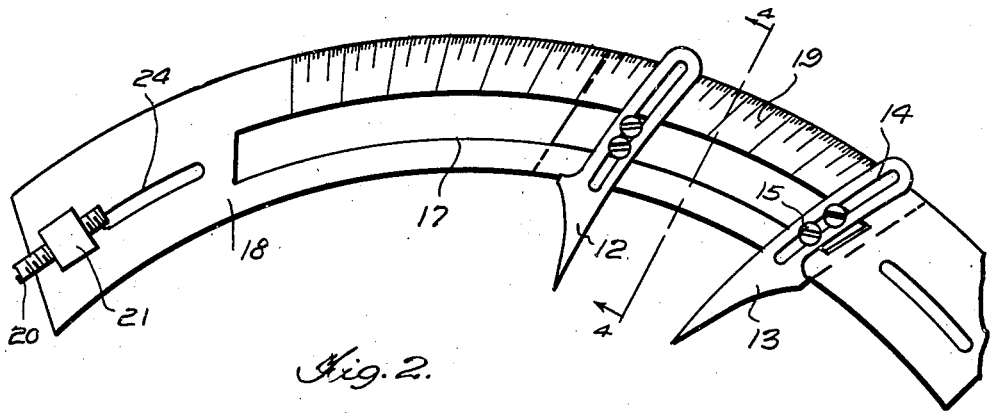
Figure 2 is a detail of the adjustable indicators and support therefor.
Figure 3:
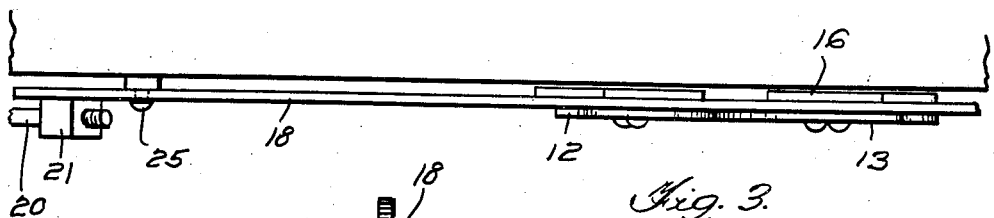
Figure 3 is an edge elevational view thereof.
Figure 4:
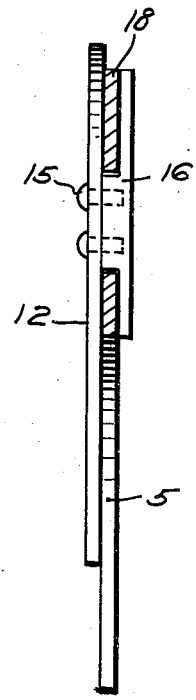
Figure 4 is a sectional view taken substantially on a line 4—4 of Figure 2.

Referring now to the drawings in detail, wherein for the purpose of illustration I have disclosed a preferred embodiment of the invention, the numeral 5 designates an instrument panel on which the chart 6 is rotatably positioned, the chart being rotated by means of a conventional form of clock mechanism from a shaft 7.

The surface of the chart is subdivided with curved substantially radially extending lines 8 denoting divisions of time and concentric lines 9 denoting degrees of temperature.

A temperature controlled stylus arm 10 is formed at its outer end with a scriber or pen bearing against the chart and movable radially thereof in accordance with variations of the temperature to which the batch of food is being subjected while being cooked to record such temperature on the chart in a manner as will be apparent.

In order to indicate a predetermined length of time for cooking the food, I provide a pair of indicators designated at 12 and 13, each of the indicators being curved longitudinally in accordance with the curvature of the lines 8 and formed with longitudinally extending slots 14 receiving set screws 15 for attaching a clamping plate 16 thereto, the clamping plate being disposed crosswise of an arcuate slot 17 formed longitudinally in an arcuate supporting plate 18 positioned adjacent the edge of the chart.

Graduations 19 are marked on the upper surface of the plate 18, the graduations being curved corresponding to the radial lines 8 of the chart and adapted for alignment therewith by one edge of the indicators 12 and 13, as will be apparent from an inspection of Figure 1 of the drawings.

The supporting plate 18 is adjusted circumferentially with respect to the edge of the chart by means of a screw 20 threaded through a lug 21 rising from the plate 18, the screw being provided with a flange 22 positioned between a pair of apertured upstanding ears 23 rising from the surface of the panel 5, the ears being disposed at opposite sides of the flange 22.

At each end of the plate 18 are arcuate slots 24 through which screws 25 are positioned for securing the plate 18 to the panel 5, the tightening of the screws 25 serving to secure the plate in its adjusted position.

Both of the indicators 12 and 13 are adapted to be adjusted circumferentially with respect to the chart 6 and the indicator 13 is preferably used as a fixed indicator and the indicator 12 is adjusted relative thereto to designate the particular length of time at which the food should be cooked, both of said indicators having one end overlying the chart in a position for cooperating with the radial lines 8.

Indicator 13 is always set at zero on the graduations of plate 18 and is moved only when it is necessary to line up with the line made by the pen 11 at the start of cooking. This adjustment is made by loosening screws 15 and turning screw 20 until indicator 13 is properly aligned.

Graduations on plate 18 are indicated in minutes and indicator 12 is moved along plate 18 and aligned with the proper graduation that corresponds with the desired time the cooking is to continue.

As an example: When cooking spinach for 35 minutes at 252° F. indicator 13 is set at 252° and lined up with line showing start of cook. Indicator 12 is set at 252° and moved down plate 18 and set on graduation which indicates lapse of 35 minutes. The chart is rotated counter-clockwise and when the starting line reaches indicator 12, the cooking is completed.

It is believed the details of construction and manner of use of the device will be readily understood from the foregoing without further detailed explanation.

Having thus described the invention what I claim is:

1. An exhibitor of the class described comprising in combination a rotatable time controlled chart including a scale, a scriber mounted for movement radially on the chart to produce a record thereon in accordance with functional variations and a plurality of stationary indicators projecting inwardly at the edge of the chart in cooperation with the scale thereon and arranged in spaced relation to each other to designate a predetermined lapse of time during the recording by the scriber.

2. An exhibitor of the class described comprising in combination a rotatable time controlled chart, a scriber mounted for movement radially on the chart to produce a record thereon in accordance with functional variations said chart having concentric circles marked thereon to provide functional graduations and radially curved lines crossing the circles to provide time graduations, a fixed arcuate support adjacent one edge of the chart and having time graduations forming a continuation of said time graduations, and a plurality of indicators carried by the support adapted for aligning the time graduations of the chart and support and arranged in spaced relation to each other to designate a predetermined lapse of time during the recording by the scriber.

3. An exhibitor of the class described comprising in combination a rotatable time controlled chart, a scriber mounted for movement radially on the chart to produce a record thereon in accordance with functional variations said chart having concentric circles marked thereon to provide functional graduations and radially curved lines crossing the circles to provide time graduations, a fixed arcuate support adjacent one edge of the chart and having time graduations forming a continuation of said first-named time graduations, means for adjusting the support in a circumferential direction relative to the chart, and a plurality of indicators carried by the support adapted for aligning the time graduations of the chart and support and arranged in spaced relation to each other to designate a predetermined lapse of time during the recording by the scriber.

GEORGE O. LIEN.